United States Patent

[11] 3,564,148

[72] Inventor Otha C. Lee
Milan, Tenn.

[21] Appl. No. 753,614
[22] Filed Aug. 19, 1968
[45] Patented Feb. 16, 1971
[73] Assignee International Telephone and Telegraph Corporation
New York, N.Y.
a corporation of Delaware

[54] SWITCHING SYSTEM PROVIDING MESSAGE-WAITING AND DO-NOT-DISTURB SIGNALS ON PBX TELEPHONE EXTENSIONS
10 Claims, 6 Drawing Figs.

[52] U.S. Cl. .......... 179/18, 179/84(L)
[51] Int. Cl. .......... H04q 3/49
[50] Field of Search .......... 179/18 (PEI), 27, 27.2 (C), 27.1 (Cursory), 27.02, 42 (Cursory), 51 (Cursory), 81 (C), 84 (L), 89, 27.25

[56] References Cited

UNITED STATES PATENTS 3,050,592 8/1962 Burgener .......... 179/84(L)

*Primary Examiner*—Kathleen H. Claffy
*Assistant Examiner*—Thomas W. Brown
*Attorneys*—Walter J. Baum, C. Cornell Remsen, Jr., Rayson P. Morris, Percy P. Lantzy, J. Warren Whitesel and Delbert P. Warner

ABSTRACT: An automatic switching system is equipped to enable manual control of visual indicators at individual telephone extensions of a private branch telephone exchange. The system makes it possible for a switchboard operator to close switches to operate visual indicators at selected individual subscriber sets and thus to indicate that a message is waiting. The system makes it possible for the operator to set a do-not-disturb circuit in response to a request from a subscriber and to signal the subscriber that the request has been honored. The system also makes it possible for connections to be completed to and from the subscriber stations when the message waiting indicator is on. The system returns a busy signal when the do-not-disturb indicator is on. The system operates to restore indicator signals when such connections are terminated. The subscriber station is allowed to originate calls in the do-not-disturb condition but incoming calls are not allowed to ring the station in this condition. The operator has the option to override the do-not-disturb condition in an emergency without changing the state of said circuit.

PATENTED FEB 16 1971 3,564,148
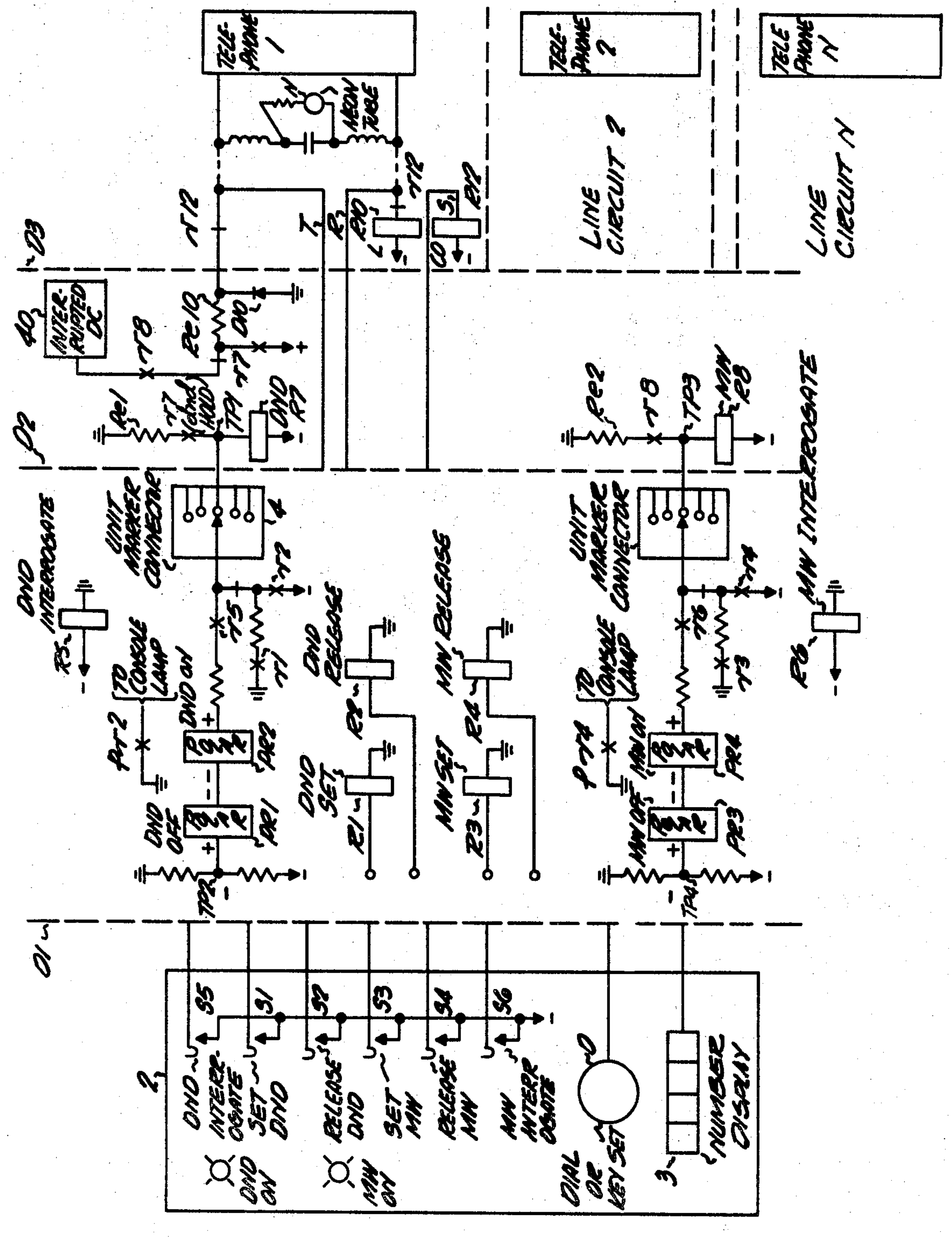
INVENTOR
O. C. LEE
BY O. B. Warner
ATTORNEY

SWITCHING SYSTEM PROVIDING MESSAGE-WAITING AND DO-NOT-DISTURB SIGNALS ON PBX TELEPHONE EXTENSIONS

This invention relates to PBX and PABX telephone systems, to manual means for controlling visible "message-waiting" indications and "do-not-disturb" indicators at telephone substations, and to means permitting the completion of calls even when the indicators are operated.

Hotels and motels are equipped usually with internal telephone systems which provide telephone service to the individual rooms. These internal systems may be connected to outside telephone networks. Since guests may be called while out of their rooms it has become commonplace with such systems to put a message-waiting light on the telephone which may be lit at the option of the switchboard attendant or operator. Usually this lamp is lit when a message comes in, and it remains lit until the guest returns and calls the attendant or operator to receive his message. Similarly, do-not-disturb lights are placed on telephones, and means are provided so that the operator can determine at the switchboard when the extension does not desire to be disturbed.

The communication requirements of society are such that they should not be disrupted needlessly. Therefore, the addition of message lamps and their associated control circuits should not be allowed to interfere with normal telephone operations. Room guests must be able to place or receive calls regardless of whether the lamps are lit or not. Moreover, the entire message service should be accomplished via the two talking wires normally provided to carry voice currents, since additional wires are very expensive to install.

In addition to the foregoing requirements of a message waiting system, there are requirements of the switching equipment which provide the telephone service. All of the necessary signals must be allowed. No unwanted signals or spurious noise may be generated. This freedom from noise is especially important in electronic switching systems which might respond to apparent commands in an unwanted manner and cause a serious failure.

Accordingly, an object of the invention is to provide new and improved message-waiting and do-not-disturb lamp systems. In this connection, an object is to provide a system which is particularly free of noise and spurious signal simulations. A further object is to provide a system, embodying signal lights, which does not adversely influence a sensitive electronic switching system. An additional object is to provide a lamp signaling system using the ordinary wires of a telephone system and permitting calls to be completed whether the lamps have been operated or not.

The foregoing objects and others auxiliary thereto may be accomplished by adding certain relays and relay controls to an automatic switching system. This additional equipment makes it possible to provide desired potentials to indicator lights and provides means through which a switchboard operator can control the lights in response to requests by guests at the extensions or, on the initiative of the operator, to advise guests that a message is waiting. Either the operator or the system marker can use parts of this additional equipment to determine when a guest at a particular extension has indicated that he does not wish to be disturbed. The additional equipment automatically restores the visual signal to the extension if it is disrupted by a call from either the operator or the guest himself. The signal lights are turned "off" permanently only when the operator uses release controls on the switchboard.

The above-mentioned and other features of this invention and the manner of obtaining them will become more apparent, and the invention itself will be best understood by reference to the following description of an embodiment of the invention taken in conjunction with the single sheet of drawing which forms a schematic diagram of the inventive message-waiting and do-not-disturb signaling system.

The FIG. illustrates switchboard equipment, associated with PBX automatic switching apparatus to the left of a vertical dash line D1, a position marker connection and additions to a marker (and connections to the marker) between vertical dash lines D1 and D2, control equipment required for each telephone extension between vertical dash lines D2 and D3, and exemplary telephone extension sets and line circuits to the right of the vertical dash line D3.

Turning first to the switchboard 2, a group of four switches S1, S2, S3 and S4 representing the controls to special line circuits are indicated. These switches are labeled "SET-DND" for "Set the do-not-disturb" indicator, "RELEASE-DND" for "Release the do-not-disturb" indicator, "SET-MW" for "set the message-waiting" indicator and "RELEASE-MX" for "release the message-waiting" indicator. By operating the appropriate one of those controls after having first dialed and connected to an indicator circuit associated with a selected extension, that circuit is acted upon through the automatic switching equipment to set or release an appropriate indicator at the corresponding telephone extension. Additional controls at S5 and S6 represent DND interrogate and MW-interrogate devices which, in particular cases, may be employed to determine whether a message waiting signal has been supplied or the extension is not to be disturbed. Signal lights at DND-ON and MW-ON will be lit in either case. It should be noted, however, that the manual controls S5 and S6 will not be necessary in conjunction with some automatic equipment where the marker checks for message-waiting and do-not-disturb and alerts the switchboard automatically.

A dial or Tel-Touch (a trademark of ITT) key set at D is indicated on the switchboard 2 to enable the operator to signal to the automatic switching equipment. A number display is indicated at 3 which can provide a room number or extension number from an identifier circuit (not shown). This displayed extension number, or a plurality of such extension numbers, can be provided by joint action of the marker and the identifier. These displayed extension numbers serve as a reminder of the number calling when a guest wishes to leave a message not to be disturbed or a message to be called at a particular time. These numbers may also serve in a particular case as reminders of numbers dialed by the operator and not yet answered.

In order to set the "do-not-disturb" indicator at a particular telephone extension, the operator dials or keys the particular room number and closes the DND-SET button or switch S1 on the operator position or switchboard console 2. The action of dialing positions the unit marker connection 4 in a well known manner to the particular indicator circuit being contacted. Operation of the DND-SET button S1 operates the DND-SET relay R1 through the marker. When the DND-SET relay operates, ground is applied over make contact *r*1 to the DND (do-not-disturb) relay R7 causing it to operate and lock through its hold contact DND or *r*7, to ground. Operation of the DND relay R7 also closes other make contacts *r*7, shown to the right of dash line D2, to complete a connection from a positive terminal through the break contact *r*12 causing the neon tube N to be lit. The neon tube N will be held subsequently in a lighted state by the DND relay until disturbed by action of either the operator or the subscriber.

The operations for setting the message waiting, or MW, equipment are very similar to those for the DND equipment. If the operator calls a room and finds that the guest does not answer, she may supply a message waiting signal with this equipment simply by operating the message-waiting set switch S3. She does not have to hold the extension.

Operation of switch S3 causes the marker to set the MW-SET relay R3 to operate and close MW-SET contacts *r*3 to complete connections to ground for the MW relay R8. The MW relay operates to close MW make contacts *r*8 locking itself to ground and closing a connection *r*8 between the interrupted DC at 40 through *r*12 to the neon tube N causing the tube to start flashing "On" and "off" to indicate to anyone observing the telephone extension that a message is waiting at the switchboard.

Release of either a message-waiting signal or a do-not-disturb signal can be effected by the operator. In the usual case, the operator first connects to the appropriate extension by dialing and looks at the DND-ON and MW-ON lights to see if they are lit. One or both will be lit (by operation of the polar-relays in a manner to be explained) if the corresponding neon tube N has been activated and appropriate switches, corresponding to relays R5 and R6, have been activated by the marker, in a conventional manner not illustrated. For the sake of simplicity, manual switches S5 and S6 are shown and they may be pushed to activate relays R5 and R6 through connections in the marker, but it will be recognized that these steps of interrogation would best be automatically controlled by the marker. If the lights DND-ON or MW-ON are lit, the operator may release the corresponding signal to the extension set by operating switch S2 controlling the DND release relay R2, or by operating the switch S4 controlling the MW release relay R4. Operation of either of these relays will cause closure of the corresponding MW-RELEASE *r4* or DND-RELEASE *r2* make contact. Closure of the appropriate "make" contact *r2* or *r4* in turn causes a potential to appear on the ground side of the corresponding MW or DND relay releasing it, opening the MW *r8* or DND *r7* make contacts and breaking the circuit to the neon tube.

In order to determine, before incoming connections are completed, whether a guest has left instructions not to be disturbed and also whether a message waiting signal is being supplied, the marker in the PBX operates a DND interrogate relay R5 and an MW interrogate relay R6 as part of a busy test sequence when an attempt is made to reach an extension. If a do-not-disturb signal is being supplied to the extension being called, a visual signal will be supplied to the operator (due to operation of relay PR2) who may then break into the connection and inform the caller of the do-not-disturb request. Actually, the marker connects the trunk to the extension and does not allow ringing voltage to be applied, at the same time lighting the lamp at the console. The operator then may ring the extension by operating a ring key and in no way upsetting the condition of the indicator circuit.

Energization of the DND interrogate relay R5 in response to an inquiry from the marker, causes operation of the respective make and break DND interrogate contacts *r6*. As a result, the *r5* (or DND) break contacts disconnect contacts *r1* and *r2* from the circuit while the polar relays PR1 and PR2 are connected between the test points TP1 and TP2. If TP1 has a more positive potential than does TP2, then the polar relay DND-ON PR2 will operate, but, if TP2 is more positive than TP1, polar relay DND-OFF PR1 will operate.

In an exemplary situation, the potential at TP2 will be −36 volts and the potential at TP1 will be −48 volts when relay DND R7 is not operated. When relay DND R7 is operated, coinciding to times when the extension is not to be disturbed, the potential at TP1 will be about −24 volts because of a voltage drop across the resistor R*el*. The corresponding polar relay therefore will operate, depending upon the relative polarity, to indicate whether the guest may be called or not. If not, a visual or audio signal will be supplied to the console over closed PR2 contacts.

The operation of the message-waiting aspect of the invention, at least insofar as it relates to interrogation from the marker, involves nearly identical circuit arrangements to those providing the do-not-disturb feature. Operation of the message-waiting interrogate relay R6 by the marker, as one step in a busy test sequence, will cause operation of the respective make and break contacts *r6*. With the operation of contact *r6*, the make contacts *r3* and *r4* are disconnected from the circuit while the polar relays PR3 and PR4 are connected between the test points TP3 and TP4. If point TP3 is more positive than TP4, the polar relay PR4 will operate; but, if test point TP4 is more positive than point TP3, polar relay PR3 will operate.

In a particular example of operating potentials for the foregoing, the potential at TP4 will be −36 volts and the potential TP3 will be −48 volts when the message waiting relay R8 is not operated. When relay R8 is operated, coinciding to times when the extension has a message-waiting signal impressed upon it, the potential at TP3 will be about −24 volts because of a voltage drop across the resistor R*e*2. The corresponding polar relay therefore will operate, depending upon the relative polarity to indicate whether the guest may be called as not. If not, a visual or audio signal will be supplied to the console over closed PR4 contacts.

In order to enable the guest at an extension to complete a call when the corresponding neon lamp N is operating, a diode D10 is provided. As will be appreciated from the circuit in the drawing, this diode is reverse biased so long as a steady positive signal is supplied over closed "make" contacts *r7* and it may be held in a reverse-bias station by an interrupted DC supplied over closed "make" contacts *r8*. However, as soon as the telephone receiver at "1" is removed, a forward bias is applied over the relay L causing the diode D10 to conduct and effectively disconnecting the neon tube N. Connection of the tip and ring lines T and R through the "off hook" switch will be detected by the marker and relay R12 will be operated to open contacts *r12*. It will be noted that the guest may now receive dial tone, dial out and talk over the T and R lines. Whenever the extension goes "on-hook" again any signals previously going to the neon tube will be restored unless the operator has released the DND or MW relays.

While the principles of the invention have been described above in connection with specific apparatus and applications, it is to be understood that this description is made only by way of example and not as a limitation on the scope of the invention. Many details of embodiments of the invention may be varied. For example, the unit marker connection 4 is shown as a stepping switch, but gang relays or other alternative switching means may be used. A position marker connection (which has not been illustrated) will ordinarily be placed between the operator position and the marker.

I claim:

1. A system for controlling visual indicators in individual telephone extensions of a private branch telephone exchange, comprising:
   an operator position;
   automatic switching apparatus coupled to said operator position;
   a plurality of telephone extension sets coupled to said automatic switching apparatus;
   a visual indicator lamp associated with each telephone extension set;
   control equipment associated with each extension set for control of the respective visual indicator;
   said control equipment including a relay for closing make contacts and completing a connection to a source of potential for operating said visual indicator;
   said automatic switching apparatus including means responsive to signals from said operator position to control the relay in said control equipment; and
   said automatic switching means including means for providing an indication to the operator position, responsive to the signals from said operator, that said visual indicator is functioning.

2. A system as claimed in claim 1, in which:
   the operator position includes a do-not-disturb control, and said relay is made responsive through said automatic switching;
   apparatus, to operation of the do-not-disturb control, said relay serving to connect a source of steady state; and
   current to a visual indicator of a preselected telephone extension.

3. A system as claimed in claim 1, in which the operator position includes a message-waiting control, and said relay is made responsive, through said automatic switching apparatus, to operation of the message-waiting control to connect a source of interrupted DC signals to a visual indicator of a preselected telephone extension.

4. A system as claimed in claim 1, in which:
   means are provided to permit said relay to hold its make contacts while it completes a connection for speech between the telephone extension and the switchboard; and said relay reconnects the source of potential to the visual indicator when the speech connection is broken.

5. A system as claimed in claim 1 in which the automatic switching apparatus incorporates interrogating means for determining whether a signal to operate said visual indicator is being applied to a particular extension set.

6. A system as claimed in claim 5, in which:

the interrogating means includes first and second polar relays connected in series between first and second sources of potential;

said first source consisting of a fixed potential source;

said second source comprising a potential dependent upon the status of operation of said relay for closing make contacts; operation of said first polar relay indicating that a signal of one polarity is being supplied to said relay; and operation of the second polar relay indicating that a signal of the opposite polarity is being supplied to said relay.

7. A system as claimed in claim 6, in which a console lamp is coupled to a relay contact controlled by the second polar relay to provide an indication on the console that a signal is being supplied to said relay.

8. A system for controlling visual indicators in individual telephone extensions of a private branch telephone exchange, comprising:

an operator position;

automatic switching apparatus coupled to said operator position;

a plurality of telephone extension sets coupled to said automatic switching apparatus;

a visual indicator lamp associated with each telephone extension set;

control equipment associated with each extension set for control of the respective visual indicator;

said control equipment including a relay for closing make contacts and completing a connection to a source of potential for operating said visual indicator;

said automatic switching apparatus including means responsive to signals from said operator position to control the relay in said control equipment; and the automatic switching apparatus incorporating interrogating means for determining whether a signal to operate said visual indicator is being applied to a particular extension set.

9. A system as claimed in claim 8, in which:

the interrogating means includes first and second polar relays connected in series between first and second sources of potential;

said first source consisting of a fixed potential source;

said second source comprising a potential dependent upon the status of operation of said relay for closing make contacts;

operation of said first polar relay indicating that a signal of one polarity is being supplied to said relay; and operation of the second polar relay indicating that a signal of the opposite polarity is being supplied to said relay.

10. A system as claimed in claim 9, in which a console lamp is coupled to a relay contact controlled by the second polar relay to provide an indication on the console that a signal is being supplied to said relay.